United States Patent
Althaus et al.

(10) Patent No.: US 6,697,851 B1
(45) Date of Patent: Feb. 24, 2004

(54) METHOD AND APPARATUS FOR IDENTIFYING CLIENTS USING INCOMING OPTION DATA

(75) Inventors: Gregory Scott Althaus, Austin, TX (US); David Alexander Babbitt, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,198

(22) Filed: Sep. 2, 1999

(51) Int. Cl.[7] .............................................. G06F 15/177
(52) U.S. Cl. ...................... 709/220; 709/203; 709/222; 709/223; 709/224; 370/254; 700/178
(58) Field of Search ................................ 709/203, 223, 709/220, 222, 224; 700/178; 370/254

(56) References Cited

U.S. PATENT DOCUMENTS

| | | | | |
|---|---|---|---|---|
| 5,475,819 A | * | 12/1995 | Miller et al. ................ | 700/178 |
| 5,568,644 A | * | 10/1996 | Nelson et al. ............... | 395/741 |
| 5,710,885 A | * | 1/1998 | Bondi ......................... | 709/224 |
| 5,963,207 A | * | 10/1999 | Brewer et al. ............... | 345/352 |
| 6,009,103 A | * | 12/1999 | Woundy ...................... | 370/401 |
| 6,061,679 A | * | 5/2000 | Bournas et al. ................ | 707/3 |
| 6,070,187 A | * | 5/2000 | Subramaniam et al. ..... | 709/220 |
| 6,115,545 A | * | 9/2000 | Mellquist ..................... | 709/220 |
| 6,115,742 A | * | 9/2000 | Franklin et al. ............. | 709/224 |
| 6,119,157 A | * | 9/2000 | Traversat et al. ............ | 709/220 |
| 6,286,038 B1 | * | 9/2001 | Reichmeyer et al. ........ | 709/220 |
| 6,310,632 B1 | * | 10/2001 | Monroe et al. .............. | 345/808 |
| 6,345,294 B1 | * | 2/2002 | O'Toole et al. .............. | 709/222 |

* cited by examiner

Primary Examiner—Hosain Alam
Assistant Examiner—Thu Ha Nguyen
(74) Attorney, Agent, or Firm—Duke W. Yee; Volel Emile; Stephen R. Tkacs

(57) ABSTRACT

A method and apparatus in a distributed data processing system for selecting configuration information for a client in the distributed data processing system. A request is received at a server from the client for configuration information. A subnet for the client is identified using the configuration information. A set of identification tokens is identified from the request. A plurality of containers in a hierarchical structure is traversed using the subnet and identification tokens to identify selected containers within the plurality of containers matching the subnet and the identification tokens. The identified containers are selected in an order the preserves preference as determined by their arrangement in the hierarchical structure and by the data that each contains. Configuration information is obtained from selected containers within the plurality of containers to form selected configuration information. The selected configuration information is sent to the client.

26 Claims, 11 Drawing Sheets

```
      800
       ↓
UDP: 00000000  01010600  1b234d2d  00000000  00000000  00000000  |.........#M-....|
UDP: 00000010  00000000  00000000  00000000  00040000  002035b5  |............. 5.|
UDP: 00000020  3b4d0000  00000000  00000000  00000000  00000000  |;M..............|
UDP: 00000030* 00000000
UDP: *000000e0  00000000  00000000  00000000  00000000  638253363  |............c.Sc|
UDP: 000000f0  35010f3d  07010020  35b53b4d  0c066b75  |5.=... 5.;M..ku|
UDP: 00000100  6e676675  0f166479  6e616d69  632e6175  |ngfu..dynamic.au|
UDP: 00000110  7374696e  2e696d62  2e636f6d  ff000000  |stin.ibm.com....|
UDP: 00000120* 00000000  00000000  00000000  00000000
UDP: *00000220  00000000                                |......          |
```

FIG. 8

```
      900
       ↓
UDP: 00000000  02010600  6dd896a0  00000000  00000000  00000000  |.........m......|
UDP: 00000010  0c010101  0c010100  00000000  00000000  002035b5  |.............. 5.|
UDP: 00000020  3b4d0000  00000000  00000000  00000000  00000000  |;M..............|
UDP: 00000030* 00000000
UDP: *000000e0  00000000  00000000  00000000  00000000  638253363  |............c.Sc|
UDP: 000000f0  35010536  040c0101  020104ff  fff00003  |5...6........kun|
UDP: 00000100  040c0101  01060409  03950250c  066b756e  |gfu..dynamic.aus|
UDP: 00000110  6766750f  16647796e  6164d693  2e617573  |tin.ibm.com3....|
UDP: 00000120  74696e2e  6962d6e2e  636f6d33  04000000e  |.8.globalK......|
UDP: 00000130  10380667  6c6f6261  6c4b0401  010101ff
```

| 1800 | VISITED | UNVISITED | |
|---|---|---|---|
| 1802 | | SUBNET X | ← P1<br>← P2 |
| 1804 | SUBNET X | CONTAINER A | ← P1<br>← P2 |
| 1806 | SUBNET X | CONTAINER A<br>CONTAINER B | ← P1<br>← P2 |
| 1808 | SUBNET X | CONTAINER A<br>CONTAINER B<br>CONTAINER C | ← P1<br>← P2 |
| 1810 | SUBNET X | CONTAINER D<br>CONTAINER A<br>CONTAINER B<br>CONTAINER C | ← P1<br>← P2 |
| 1812 | SUBNET X<br>CONTAINER D | CONTAINER A<br>CONTAINER B<br>CONTAINER C<br>CONTAINER F | ← P1<br>← P2 |
| 1814 | SUBNET X<br>CONTAINER D<br>CONTAINER A | CONTAINER B<br>CONTAINER C<br>CONTAINER F | ← P1<br>← P2 |
| 1816 | SUBNET X<br>CONTAINER D<br>CONTAINER A<br>CONTAINER B | CONTAINER E<br>CONTAINER C<br>CONTAINER F | ← P1<br>← P2 |
| 1818 | SUBNET X<br>CONTAINER D<br>CONTAINER A<br>CONTAINER B<br>CONTAINER E | CONTAINER C<br>CONTAINER F | |
| 1820 | SUBNET X<br>CONTAINER D<br>CONTAINER A<br>CONTAINER B<br>CONTAINER E<br>CONTAINER C | CONTAINER F | |
| 1822 | SUBNET X<br>CONTAINER D<br>CONTAINER A<br>CONTAINER B<br>CONTAINER E<br>CONTAINER C<br>CONTAINER F | | |

FIG. 15

| 1500 | VISITED | UNVISITED |
|---|---|---|
| 1501 | | SUBNET Y |
| 1502 | SUBNET Y | CONTAINER D<br>CONTAINER E |
| 1503 | SUBNET Y<br>CONTAINER D | CONTAINER E |
| 1504 | SUBNET Y<br>CONTAINER D<br>CONTAINER E | CONTAINER G |
| 1505 | SUBNET Y<br>CONTAINER D<br>CONTAINER E<br>CONTAINER G | |

METHOD AND APPARATUS FOR IDENTIFYING CLIENTS USING INCOMING OPTION DATA

BACKGROUND OF THE INVENTION

1. Technical Field

The present invention relates generally to an improved data processing system and in particular to a method and apparatus for identifying clients in a distributed data processing system. Still more particularly, the present invention provides a method and apparatus for identifying clients in a distributed data processing system using a combination of client-specified identifying data.

2. Description of Related Art

A dynamic host configuration protocol (DHCP) server provides the ability for a network administrator to centralize the configuration of internet protocol (IP) addresses and operating parameters for all capable network-attached devices. Through this protocol and the structure of a DHCP message, a DHCP client is able to receive an IP address to be assigned to the interface through which the client was communicating with the DHCP server. Additionally, this client may also receive a list of operating parameters specified by the server to be used by the client. Additionally, when communicating with the server, clients may specify suggested operating values and other defining parameters to uniquely identify itself and/or to classify itself as a member of a set of clients sharing some common type. Under the protocol, with the exception of the assignment of the IP address, all information that is exchanged between a client and a server is performed through what is known as "Options". These options are small sections of data in the DHCP message used to specify the type of option and its data.

A DHCP server typically identifies one of the client computers that it services through the client identifier option, which is most often a hardware address of the client adapter wishing to receive an interface address or a unique string as defined by the client user. In addition, most DHCP servers will allow for the configuration specialization of a serviced client by defining a particular set of operating parameters to be given to a specific client by singling out that client's unique identifier in the server's configuration. Presently, Advanced Interactive Executive (AIX) servers, available from International Business Machines Corporation, have extended this configuration specialization to include two more identifying characteristics of any client. These characteristics include the vendor class identifier option and the user sit class identifier option. "AIX" is a version of the Unix system provided by International Business Machines Corporation for its Unix workstations and personal computers.

For example, a Hewlett-Packard printer acting as a DHCP client, may identify itself uniquely through its hardware address in the client identifier option, and will identify itself as a member of the Hewlett-Packard printer family through its vendor class identifier option. Based on this information and the server's configuration, the server can offer specialized operating parameters based on each identifying characteristic. Therefore, the client's IP address is chosen based on the client's unique identifier option, and as an operating parameter, the IP address of the Syslog server is sent to the client because of the client's vendor class identifier option. A Syslog server is a system which provides a network service to centralize the logging of informational or error messages.

Presently, however, an inability exists for clients to provide specific information to a server other than through vendor class information, user site class information, and a unique client identifier. As a result, configuration information must be returned for a particular client or for an entire family. Additional granularity is unavailable in presently used systems.

Therefore, it would be advantageous to have an improved method and apparatus for allowing identification and configuration of clients by different combinations of incoming option data.

SUMMARY OF THE INVENTION

The present invention provides a method and apparatus in a distributed data processing system for selecting configuration information for a client in the distributed data processing system. A request is received at a server from the client for configuration information. A subnet for the client is identified using the configuration information. Multiple identification tokens are identified from the request. A plurality of containers in a hierarchical structure is traversed using the subnet and identification tokens to identify and order by preference selected containers within the plurality of containers matching the subnet and the identification tokens. Configuration information is obtained from selected containers within the plurality of containers based on containers to form selected configuration information. The selected configuration information is sent to the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram of a request message generated by a DHCP client in accordance with a preferred embodiment of the present invention;

FIG. 9 is a diagram of a response message generated by a DHCP server in accordance with a preferred embodiment of the present invention;

FIG. 15 is a diagram illustrating traversal of server configuration tree in accordance with a preferred embodiment of the present invention; and FIGS. 16–18 are diagrams illustrating the structure of configuration data for a server in accordance with a preferred embodiment of the present invention.

DETAILED DESCRIPTION OF THE PREFERRED EMBODIMENT

Figure 1:
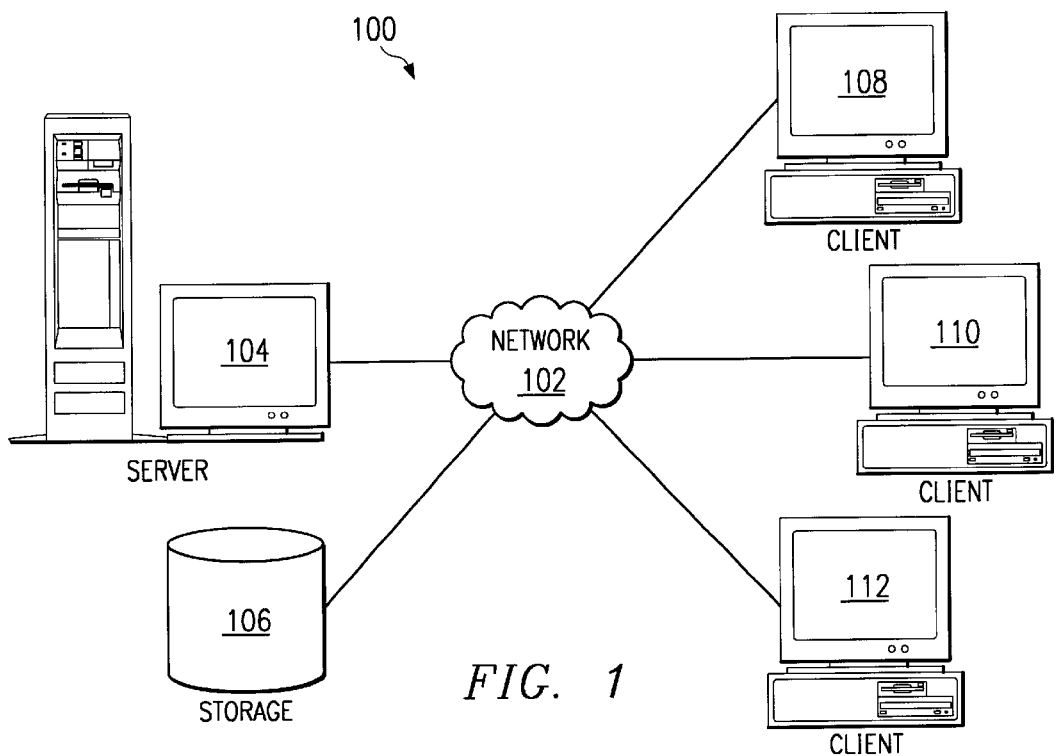
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, computers or other devices, such as, for example, a printer or other network appliance. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major node or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
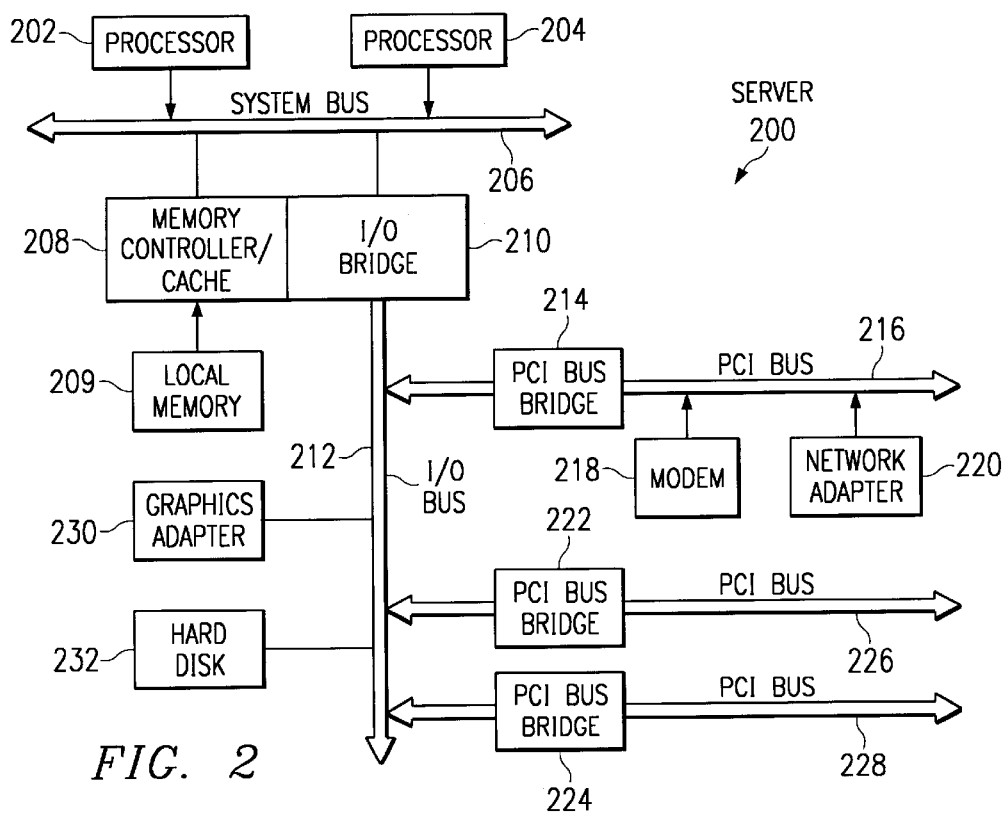
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
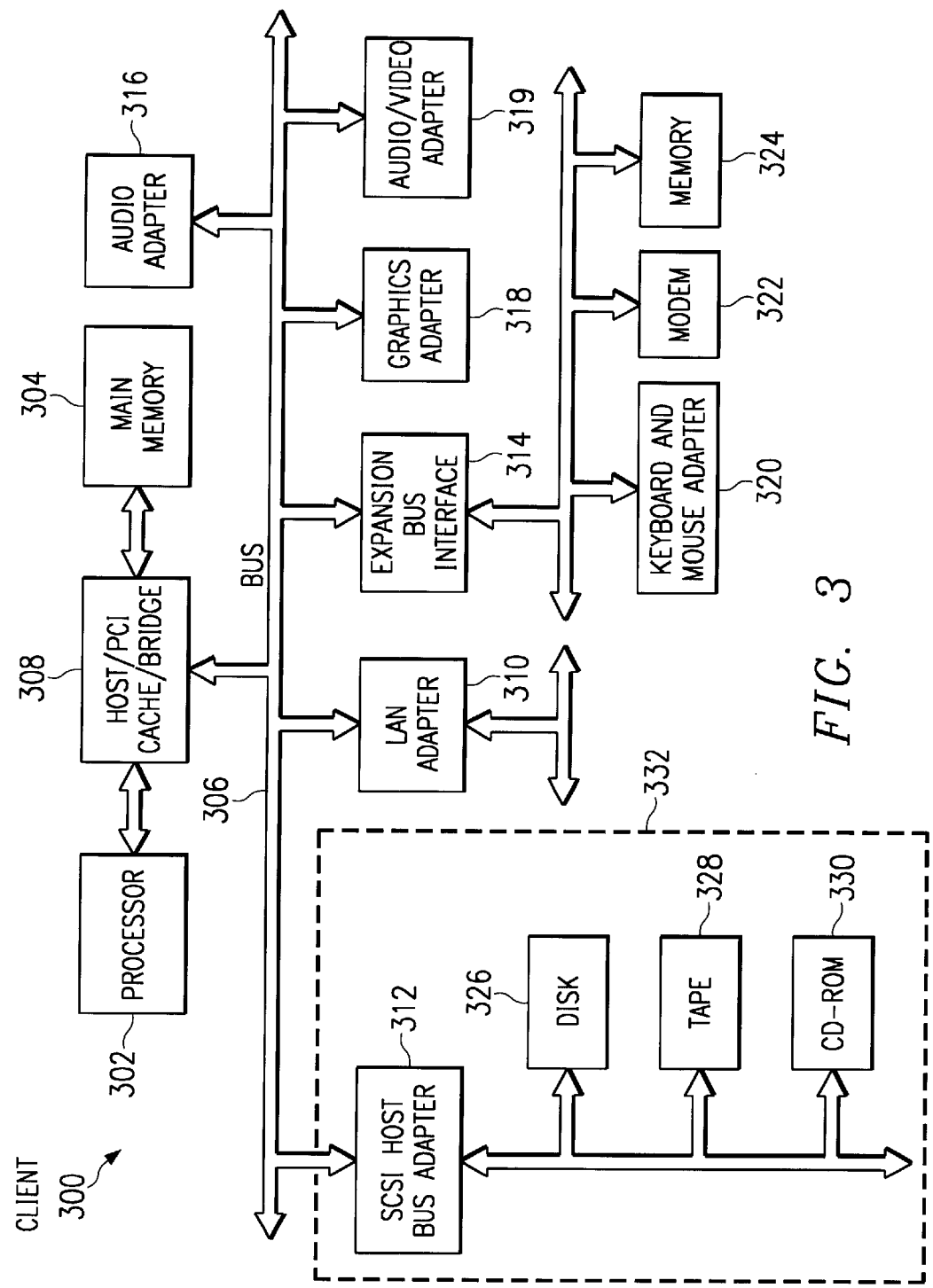
FIG. 3 is a block diagram illustrates a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture(ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

DHCP allows a client with no understanding of the network address or network topology to use a limited broadcast message on the network to communicate with the server to obtain proper network configuration information. An unconfigured client with a zero source IP address (0.0.0.0) broadcasts a DHCP discover message to 255.255.255.255 to search for DHCP servers. In response, every server receiving the broadcast associates the client's unique DHCP identifier option or hardware address with an IP address from configured address ranges. The address will be reserved for the client's use. A response message is unicast from each server to the client. The client will collect the IP address and the option information from each message and choose one. In response, a request message is broadcast by the client in which the message identifies the server and address chosen by the client. All servers which may have offered the client an address will receive the broadcast request message. Only one server, however, is identified in the message. The identified server will respond with a unicast acknowledgment message containing the IP address and associated time that the address is valid. This address is now leased or assigned to the client. The mechanism of the present invention allows for the client to send additional option information for use by the server in assigning IP addresses or in selecting option information.

The present invention provides a method, apparatus, and computer implemented instructions to identify or classify clients through any combination of option data indicated by the client. Rather than specify the limitation in the server product code that a client can be classified only by its identifier option, vendor class option, and its user site identifier option, the specificity of these options are removed in the present invention. Instead, the mechanism of the present invention allows the server to be configured to choose any arbitrary identifying token(s) that may be indicated by a client as the basis for the client IP address assignment or client's operating parameters selection. Additionally, these identifying tokens can be chosen singularly or in combination for the purpose of determining the client IP address assignment or client operating parameters. This mechanism allows for better specialization in address and parameter selection for each client on the network with less configuration file information.

The DHCP server's configuration information is stored internally in a tree format. A tree of network subnets that are administered by the server exists, and rooted at each node in this subnet tree is a tree of configuration information grouped by the identifying token that must be specified by a client in order to receive the contained configuration information. Each of the nodes in this second tree is known as a container.

Previously, while the container tree nodes could reference a seemingly infinite number of children, these children were all grouped based on a small set of specific identifying tokens. A list or a hash table for sub-containers, or child nodes of a container, exists based on the Client Identifier Option, one for sub-containers based on the Vendor Class Identifier Option, etc. To allow for the arbitrary definition of a container in configuration, as described by the present invention, each container tree node defines a place to anchor sub-containers per any option number, and because each container can contain multiple sub-containers of the same identifying option number with varying option data, each of these anchor points must either be a list, a hash table, or any other appropriate data structure. What is chosen is to link each of the sub-containers through a large, 256-member array of hash tables. The index into the array of hash tables specifies the option number that can be specified by the client (option numbers are limited to the range 0 through 255), and the size of the hash tables can grow dynamically to improve performance for multiple sub-containers of the same option number while limiting the memory usage of just a few or a single sub-container of the option number. Also, using an array of hash tables allows for a constant time of search when attempting to locate any sub-container of a particular option number.

As provided by the present invention, by comparing each option number and data as specified by the client against each of the containers in the configuration tree, an ordered list of preference among all of the matching configuration tree containers is determined that can be used to select an IP address and to aggregate the offered parameter options to the client. Preference is determined through depth of matching containers in the tree and through an arbitrary preference value or by preference order conveyed through the configuration mechanism for matching containers at the same depth within the tree.

Two queues are used to determine the ordered list of containers, also called "nodes," chosen for the address and parameter options selection. The first queue is the visited-nodes queue, and this queue consists of references to nodes in the tree that match the client in some way. Each member is in the correct order from least specific or the matching node of least priority to the most specific or to the matching node of greatest priority. The second queue is a working queue of unvisited-nodes that defines how the first queue is to be built. This working queue contains a list of unvisited nodes. The working queue is initially populated with a single node that is the subnet from which the client is attempting to obtain an address, which is the node in which one of the server's configuration trees is rooted.

As nodes are taken from the head of the working queue they are examined, or "visited", and added to the tail of the visited-nodes queue. As each node is moved, its children are examined against the incoming option set of the DHCP client wishing to receive a response, and each matching child node is added to the working queue. A match is determined when the DHCP client indicates the same option number as defined by the container and a match in option data as defined by the container. The process continues until the last node on the working queue is "visited" and added to the tail of the final queue.

Those of ordinary skill in the art will appreciate that this algorithm is similar to a map-walking algorithm in which queues or stacks are used to unroll functional recursion. However, this process differs from the map-walking process in the insertion onto the working queue. Because of how the child containers are anchored to their parent inside the hash tables at each index in the array, any order of priority or preference among children to the same parent container that may have been related by the configuration mechanism is essentially lost. This order of importance must be recreated in accordance with the present invention. To recreate the order of importance, the working queue is divided into three tiers. The first tier is the set of non-client-specific containers (where client-specific is a container to be matched against the client's unique Client Identifier option) that have been added prior to examining the current node being "visited," and the second tier contains all of the non-client-specific nodes added during the current "visit." The third tier specifies the matching client-specific containers found during the entire tree traversal.

Insertion of nodes onto the working queue occurs only into the second and third tiers, where a new non-client-specific container node is sorted into its tier based on the order of appearance in the configuration file, and a new client-specific container is placed at the tail of its tier in the queue. What this means is that the matching client-specific containers will always be considered the most specific types of containers to ever match against an incoming client's data, and the remainder of the matching containers in the second tier will appear based in an order that preserves the preference order conveyed through configuration.

When all of the matching sub-containers of the node currently being "visited" are added to the working queue, the second tier collapses into the first tier, the third tier is preserved, and the next member from the head of the working queue is extracted to repeat the process. Finally, when the working queue becomes empty, the visited-nodes queue will contain a proper path, walked from end to the beginning, to be used to find the aggregation of the offered operating parameters to the client, and can optionally be used to find the address for the client.

Figure 4:
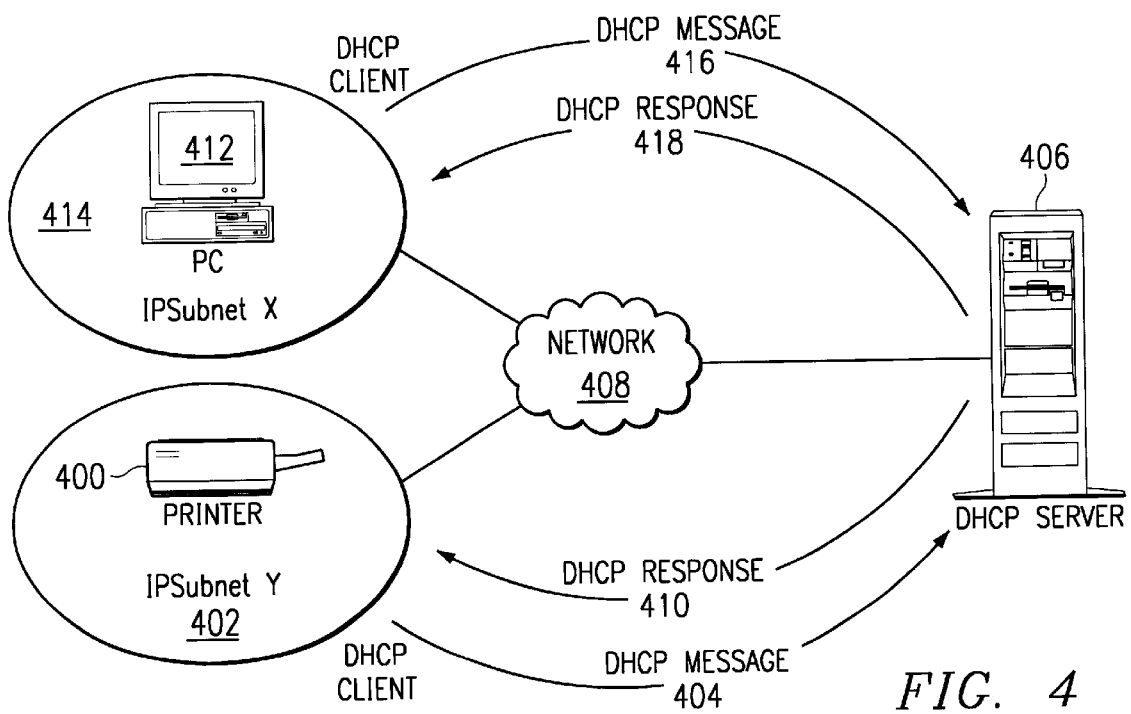
FIG. 4 is a data flow diagram illustrating messages and responses between clients and servers in accordance with a preferred embodiment of the present invention.

With reference now to FIG. 4, a data flow diagram illustrating messages and responses between clients and servers is depicted in accordance with a preferred embodiment of the present invention. In the depicted example, a printer 400 in IP subnet Y 402 may send a message 404 to server 406 through network 408 requesting an IP address and configuration information. In these examples, the message sent by printer 400 includes an identifier of IP subnet Y 402, option 60, and data "Lexmark". In response, server 406 returns a response message 410 to printer 400 in IP subnet Y 402, containing data sets 1, 4, and 6 in these examples. Additionally, PC 412 in IP subnet X 414 may send a message 416 to server 406. In this example, message 416 includes an identification of IP subnet X 414 option 77, data "marketing", option 15, data "austin.ibm.com". In response, a server may return data sets 1, 2, 3, and 7 in response 418 to PC 412. In this example, the returned data sets are chosen based on the option data indicated by the client in comparison to the configuration data of the server as described in FIG. 5, server configuration 500.

Figure 5:
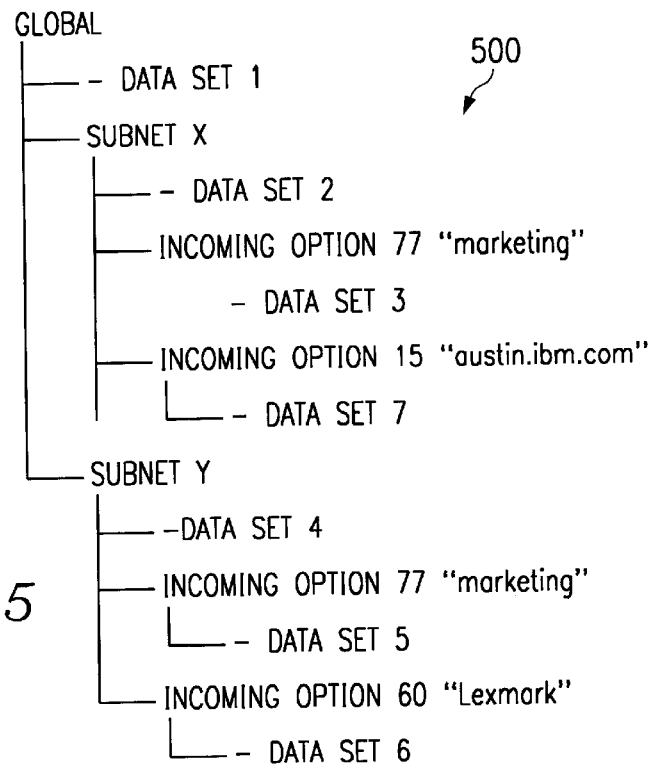
FIG. 5 is a diagram of a server configuration in accordance with a preferred embodiment of the present invention.

Turning to FIG. 5, a diagram of a server configuration is depicted in accordance with a preferred embodiment of the present invention. Server configuration 500 provides a hierarchical illustration of data that may be returned based on different option and identification information received by clients at a server.

Figure 6:
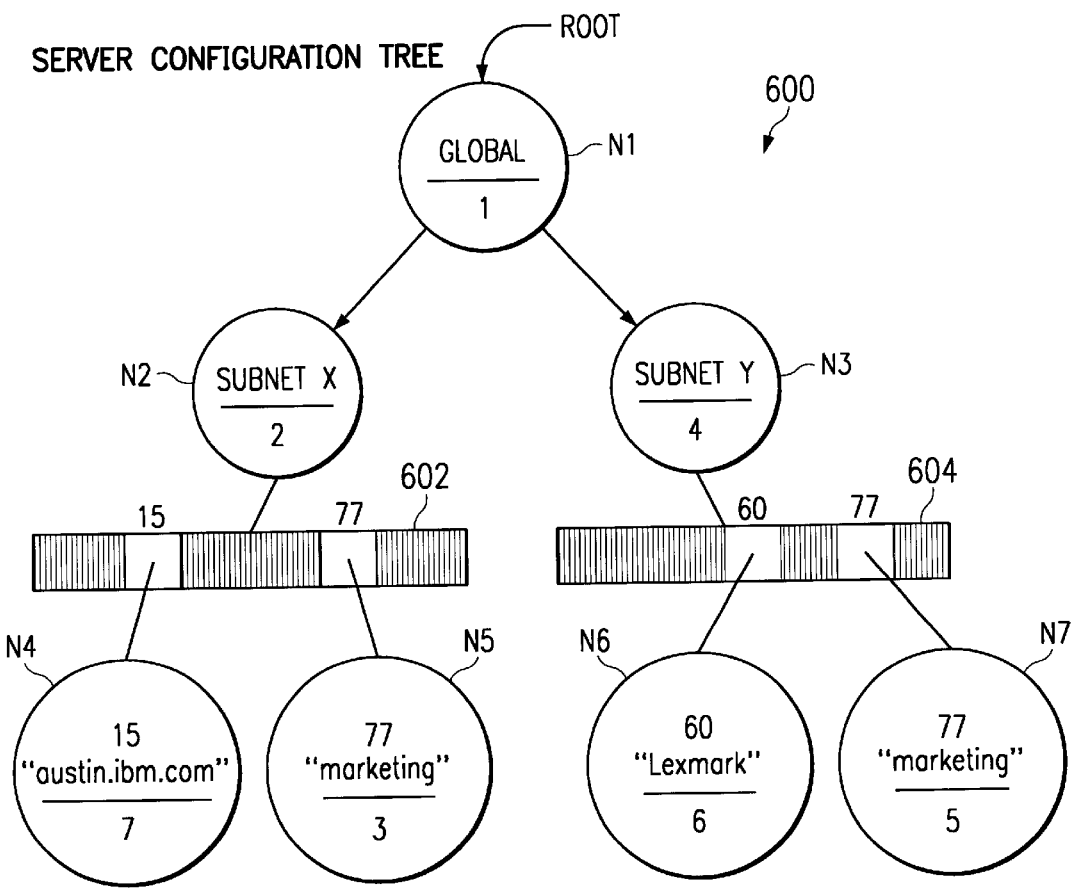
FIG. 6 is an example of a server configuration tree in accordance with a preferred embodiment of the present invention.

Turning next to FIG. 6, an example of a server configuration tree is depicted in accordance with a preferred embodiment of the present invention. In this example, tree 600 contains a number of containers, also referred to as configuration tree nodes. In this example, server configuration tree 600 includes nodes N1, N2, N3, N4, N5, N6, and N7. The present invention allows defining a container or configuration tree node of any option type. Each configuration tree node encompasses the identifier type the container or node matches against, the label or the data of the identifier with which to match, and the data sentence that is to be returned to the client matching the container.

In this example, node N1 is the root node in server configuration tree 600 and represents the global level in server configuration 500 in FIG. 5. All of the identifiers in these nodes are illustrated in the form of "option type" and "option value". Node N2 and N3 are children nodes of node N1, which is the parent node. Node N4 and N5 are children node to node N2, while node N6 and N7 are children nodes to node N3. Node N2 represents subnet X in server configuration outline 500 in FIG. 5, while node N3 represents subnet Y in server configuration 500. For example, node N4 includes the identifier type 15 and a label "austin.ibm.com" with an identification of the data set 7 as can be seen with respect to server configuration 500. Node N5 includes the type 77 with a label "marketing" and an identification of data set 3 for this particular option. Node N6 has a type 60 with a label "Lexmark" and an identification of data set 6. Node N7 has a type 77 with a label "marketing" and a data set identification of 5.

Nodes N4 and N5 may be identified through array 602. When a client is identified as being physically located in subnet X, the process moves to node N2. An option identifier of 15 and matching data "austin.ibm.com" results in node N4 being identified, while an option identifier of 77 and matching data "marketing" results in node N5 being identified.

If the client were identified as being physically located in subnet Y, then node N3 would be identified. Additional nodes are identified using array 604. If the client in subnet Y also sends an option of 60 with matching data "Lexmark", then node N6 is identified using array 604. If the client supplies an identifier of 77 and matching data "marketing", then node N7 is identified for use with the client. Although node N5 and node N7 are identified by the same option number, 77, and the same data label, "marketing", different data sets may be returned depending upon the data set pointed to by the node. As can be seen with reference back to server configuration 500 in FIG. 5, a data set of 3 is returned for a matching option 77 when the client is in subnet X, while a data set of 5 is returned to a client with a matching option of 77 when the client is within subnet Y.

A client in either subnet would always be returned data set 1 from server configuration outline 500 in FIG. 5, also depicted in node N1 of FIG. 6.

Additionally, in these arrays such as array 602 and 604, the index of the member into the array has a meaning. The index of each member of the array contains all nodes of whose option type number equals the array index. For example, if the option 15 is sent, then the index 15 in the array is used to index or point to the node containing the information for the option. That node will contain the option identification data with which to match against as well as the data set itself to be returned to the client.

Figure 7:
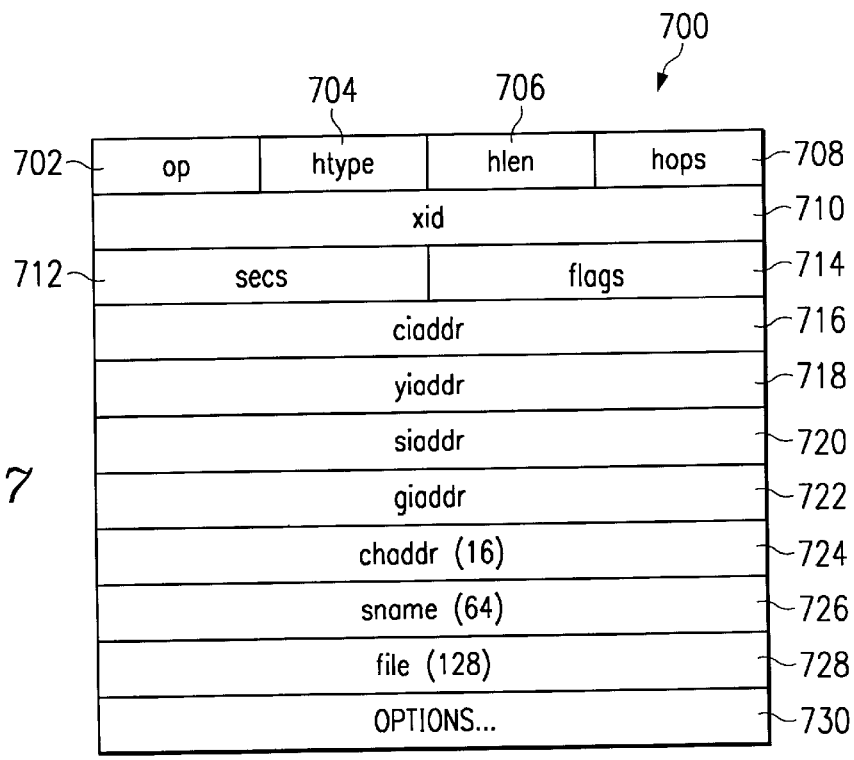
FIG. 7 is a diagram illustrating a data structure for a DHCP message in accordance with a preferred embodiment of the present invention.

With reference now to FIG. 7, a diagram illustrating a data structure for a DHCP message is depicted in accordance with a preferred embodiment of the present invention. In this example, message 700 includes op field 702, h-type field 704, h-len field 706, hops field 708, xid field 710, secs field 712, flags field 714, ciaddr field 716, yiaddr field 718, siaddr field 720, giaddr field, 722, chaddr field 724, sname field 726, file field 728, and options field 730. First, ciaddr field 716 contains the client IP address, as specified by both the client and server when the client is properly configured and using the address. Next, yiaddr field 718 is specified by the DHCP server and identifies the address offered to the client. The address of the next server to be used in a bootstrap process is found in siaddr field 720. This server may be, for example, a server that contains boot images for network stations. The receiving interface address of the gateway from which a broadcast DHCP message was re-transmitted directly to a DHCP server is found in giaddr field 722.

The client's hardware address is found in chaddr field 724. This field is used in conjunction with h-type field 704 and h-len field 706 to uniquely identify the client in the event that the client identifier option is absent from the message in options field 730.

Options field 730 contains both address identifying options and configuration information. This is a field in which the client may return different option information for different granularity to a server. All options are encoded in a code-length-data format and word boundary alignment in the options part of this message is not required. In the depicted examples, message 700 is a standard DHCP message in which additional option information may be placed into options field 730. This additional information is used by the processes of the present invention to identify clients and assign address and configuration information to the clients.

With reference to FIG. 8, a diagram of a request message generated by a DHCP client is depicted in accordance with a preferred embodiment of the present invention. Request message 800 in FIG. 8 is a hexadecimal representation of the data of a DHCP request to a DHCP server from an AIX DHCP client. This data is sent using the UDP transport over a TCP/IP network. The value in the first column following the "UDP" tag indicates the byte offset into the message for the data in that row. A value of "*********" in this column indicates a series of data bytes whose value is all zero and therefore is not printed in the output.

The data before the first "*******" break in the message defines the sender of the message and gives a hint as to from where the message may have originated. The data starting at offset 0xf0 and following the data 0x63825363 is the start of the variable-length section of data options, which each option type determines the structure and interpretation of the option data, while each byte following the option type indicates the length of the option data. Thus, each option is specified in a CODE-LENGTH-DATA format. For example, the first option is 0x350101, which is option number 53 (in decimal), with data length 1, and data value (interpreted as an unsigned 8-bit integer) 1. The next option, 0x3d0701002035b53b4d is interpreted as option number 61 (decimal), length 7, and per its data format dictated in RFC 2132, it's data value is an unsigned 8-bit integer followed by a string of hexadecimal bytes, which could be written as 1-0x002035b53b4d. Request for Comments (RFC) 2132 is a request for comments maintained by the Dynamic Host Configuration (DHC) Working Group of the Internet Engineering Task Force (IETF). RFC 2132 is authored by Ralph Droms of Bucknell University and Steve Alexander at Silicon Graphics, Inc. RFC's can be obtained from the Internet Engineering Task Force at www.ietf.org. Further into the list of options is option 0x0f1664796e616d69632e61757374696e2e69626d2e636f6d; this is option 15 (decimal), length 22**, and data (interpreted as a string) "dynamic.austin.ibm.com".

Each of these option codes has a specific meaning defined in RFC 2132, but many options, especially those with a code value of more than 128, are yet to be defined. This does not preclude a DHCP client vendor from having the ability to configure their clients for sending this type of data, and this does not preclude any DHCP server vendor from offering the ability to read or parse or attempt to understand data of that option code. In this example, the option 53 denotes the DHCP Message Type, option 61 defines the DHCP Client Identifier, and option 15 defines the DNS Domain Name.

The DHCP Client Identifier Option is to unique for each DHCP client on the network and is a means for the server to uniquely recall a DHCP client and perhaps store in memory with that information the client's previous address or set of configuration options. Most often, the DHCP Client Identifier option is generated from the hardware address of the network adapter whose interface is requiring a DHCP address lease.

Options sent to the server from a client are treated as identifiers or option suggestions. However, the options that are returned from the server are the configuration options or the operating parameters that the client is to use to configure itself on the network.

With reference next to FIG. 9, a diagram of a response message generated by a DHCP server is depicted in accordance with a preferred embodiment of the present invention. In response message 900, the options begin at byte offset 0xf0, and again each has specific meaning to the client. Option 0x0104ffffff00 specifies the subnet mask to use for the interface being configured (255.255.255.0), option 0x03040c010101 specifies the default router or default gateway to be used (12.1.1.1), option 0x060409039502 specifies the DNS server to use (9.3.149.2), etc.

Figure 10:
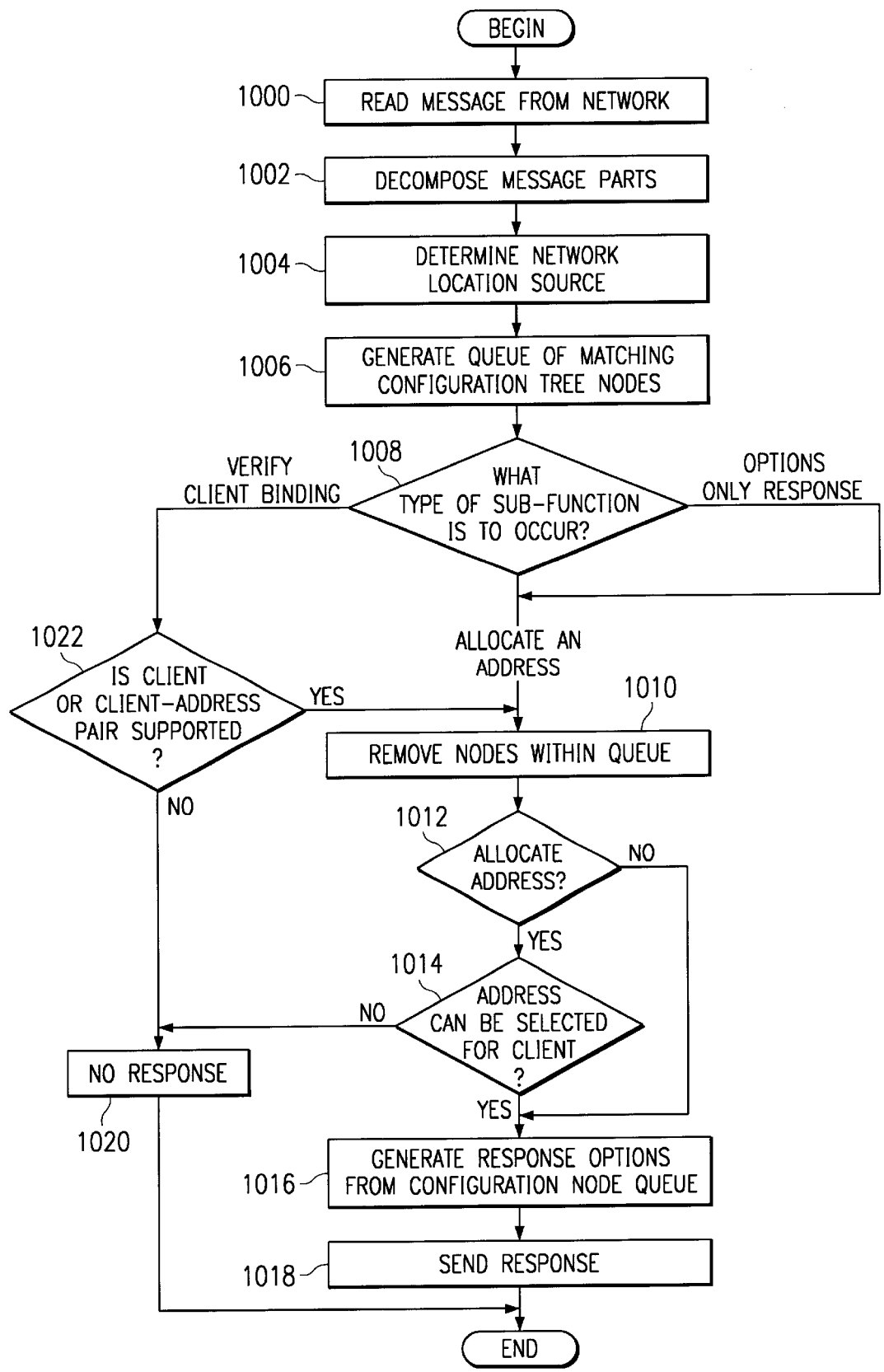
FIG. 10 is a flowchart of a process for identifying a client in accordance with a preferred embodiment of the present invention.

With reference now to FIG. 10, a flowchart of a process for identifying a client is depicted in accordance with a preferred embodiment of the present invention. The process begins by reading a message from the network (step 1000). The process then decomposes the message parts (step 1002). In step 1002, decomposing message parts involves determining the data contained in the message and either copying that data to another local buffer or referencing the data directly in the message buffer. This step is used to notice the client identifier supplied by the client and to reference the list of options indicated by the client.

Thereafter, a network location source is identified from the message (step 1004). In determining the network location of the source in step 1004, the step is later used to find the configuration tree that will be searched for configuration information as the starting subnet is determined from the source of the client's message. Determining the source is well documented in RFC 2131 and only involves looking for data in three places in the message. RFC 2131 is also maintained by the DHC Working Group of the IETF and is authored by Ralph Droms of Bucknell University. These places include the giaddr field 722 in FIG. 7, the destination address of the message, and the network address of the interface of the server on which the message was received. An ordered list of matching configuration tree nodes is generated (step 1006). The step of generating a list of matching configuration tree nodes in step 1006 essentially compares the client's defined identifiers and suggested options against a tree of configuration nodes rooted at the subnet. Each comparison of the tree will compare the option number and option data of the tree node against the option as specified by the client. The result of this search is an ordered list of nodes from the configuration tree from which operating parameters or configuration options may be identified for the clients. Optionally, a network address also may be selected for the client using the information from the list of nodes.

Next, a determination is made as to what subfunction may occur (step 1008). In accordance with the preferred embodiment of the present invention, the ordered list of configuration tree nodes can optionally be used in a series of other functions as opposed to or in addition to the aggregation of configuration parameters to be returned to a client. Other uses can include, for example, determining whether a specific client can be supported through the server's configuration and whether the ordered list of nodes specifies a specific address or range or addresses to be chosen for the client.

A possible subfunction that may occur is one in which some interactions between the client and the server will only require a response indicating the set of configuration options or operating parameters for a client without reference to an allocated address for the client. The resulting ordered list of configuration tree nodes is required this response consisting of options only. If the subfunction is an options only response, then some nodes may be required to be filtered from the ordered list (step 1010).

Allocation of an address is another possible use of the ordered list of configuration tree nodes. Once it is determined from which of the configuration tree nodes the address will be allocated for the client, the step 1010 also occurs to filter other configuration tree nodes from the ordered list.

Next, a determination is made as to whether the subfunction is an allocation of an address (step 1012). If the subfunction is an allocation of an address, a determination is made as to whether an address may be selected for the client (step 1014). If the address can be selected, then response options are generated from the ordered list (step 1016). The response is then sent onto the network to the client (step 1018), with the process terminating thereafter. With reference again to step 1014, if an address cannot be selected for the client, then no response is sent (step 1020), with the process terminating thereafter.

With reference again to step 1012, if the subfunction to occur is not to allocate an address, whether it is to generate an options only response or to verify a client binding, the process continues to step 1016.

With reference again to step 1008, if the subfunction to occur is a verification of client binding, a determination is then made as to whether the client or the client address pair is supported (step 1022). Verification of client binding is required on some occasions when a client re-attempts to verify a previous binding with the server. Such a situation may occur in the association between the unique client identifier and its previously-allocated network address. If this function is required, the ordered list of configuration tree nodes is traversed from the most specific to the least specific searching for the node from which the address was previously selected. If such a node is found, then the client binding is valid. If the node is absent, then the client binding is no longer valid. If the client or client address pair is unsupported, then the process proceeds to step 1020 as described above. If the client or client-address pair is supported, the process proceeds to step 1010 as described above.

The methods in which the server can verify a client binding can extend beyond simple address verification dependent on the type of data stored at each configuration node in the tree. Because the resulting ordered list provides the programmer an ability to realize the most specifically matching configuration tree node for the combination of input, the ordered list could be extended to also provide, for example, specific server behavior statements or server action policies to modify the method in which the server will respond or to dictate whether the server will respond at all. Should the implementation of the present invention include such behavior or policy statements within the data of the configuration nodes, the decision is made in step 1022 whether to respond.

If the client or client address pair is supported, some nodes may be required to be removed from within the ordered list prior to the process continuing beyond step 1010.

Depending upon the implementation, it is possible to not only allow for each configuration tree node to specify the operating parameters or configuration options for clients that match the node, each node also may set aside a range of network addresses that are to be allocated should a client match the configuration tree node and require an address allocation. This ability to assign network addresses based on identifiers and suggested options by a client allows the set of operating parameters or configuration options to be associated with the network addresses defined in the configuration tree nodes. This situation implies that the client should not receive an operating parameter from a particular node in the configuration tree unless the client is also receiving an address from the same node in the configuration tree. The process of removing nodes from the queue in step 1010 involves tracking node parent information within the ordered list of nodes. When a node that defines an address range is to be removed, other nodes on the queue that contain the removed node as an ancestor also are removed.

In determining whether the address can be selected in step 1014, if an address is to be selected for a client from the ordered list of nodes, the list is traversed from the most specific to the least specific in a search of a node that supports allocating any address for the client. Should such a node be absent on the ordered list of nodes, then the client is not allowed to have an address and no response is sent.

In generating response options, the final use of the ordered list of configuration tree nodes involves building a series of configuration options or operating parameters to be sent to the client. The ordered list of configuration tree nodes dictates the preference. As a result, if a configuration option of one type appears with different option data in more than one place within the list, only the option data from the more specific node is selected. No merging of option data occurs in the depicted examples. If the algorithm of the present invention is applied outside of the context of the depicted example, resulting data of the ordered list can be merged and the preference order of the list may provide, for example, a determination in how the data is merged.

In FIG. 10, the subfunctions of verifying client binding, allocation of an address, and options only response are illustrated as examples and not limitations to the types of subfunctions that may be processed using the present invention. The processes of the present invention also may be applied to other subfunctions requiring the use of an ordered list of nodes created by the processes of the present invention to return a set of options.

Figure 11:
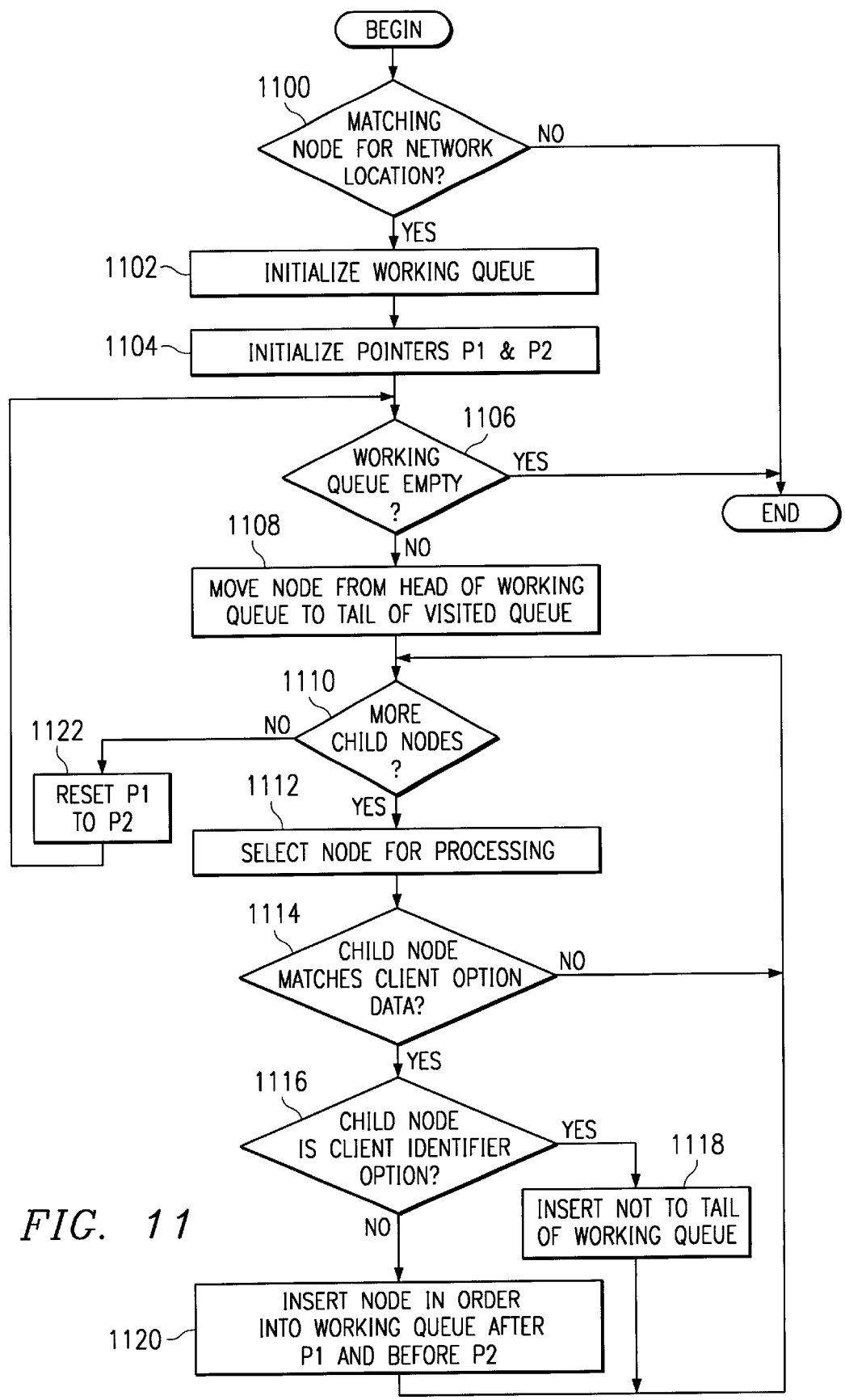
FIG. 11 is a flowchart of a process for creating a queue of matching configuration tree nodes depicted in accordance with a preferred embodiment of the present invention.

With reference now to FIG. 11, a flowchart of a process for creating a queue of matching configuration tree nodes is depicted in accordance with a preferred embodiment of the present invention. This process is a detailed description of step 1006 in FIG. 10.

The process begins by determining whether a matching configuration tree node is present for the network location of the source of the request (step 1100). This step is used to locate a configuration tree. If a node is found, a working queue is initialized with this node (step 1102). Thereafter, two pointers P1 and P2 are initialized to point after the subnet node in the working key (step 1104). Pointers P1 and P2 are non-client specific pointers in this example. A determination is then made as to whether the working queue is empty (step 1106). If the working queue is not empty, a node located at the head or beginning of the working key is moved to the tail or end of the visited queue (step 1108). A determination is then made as to whether additional unprocessed child nodes are present (step 1110). If additional child nodes are present for processing, an unprocessed child node is selected for processing (step 1112). A determination is made as to whether an unprocessed child node matches client option data (step 1114).

If the child node does not match the client option data, the process returns to step 1110. Otherwise, a determination is made as to whether the child node is a client identified option (step 1116). This determination is made to see if this node has a client-specific container. If the child node is a client identifier option, this node is inserted into the tail or end of the working queue (step 1118) with the process then returning to step 1110.

Figure 12:
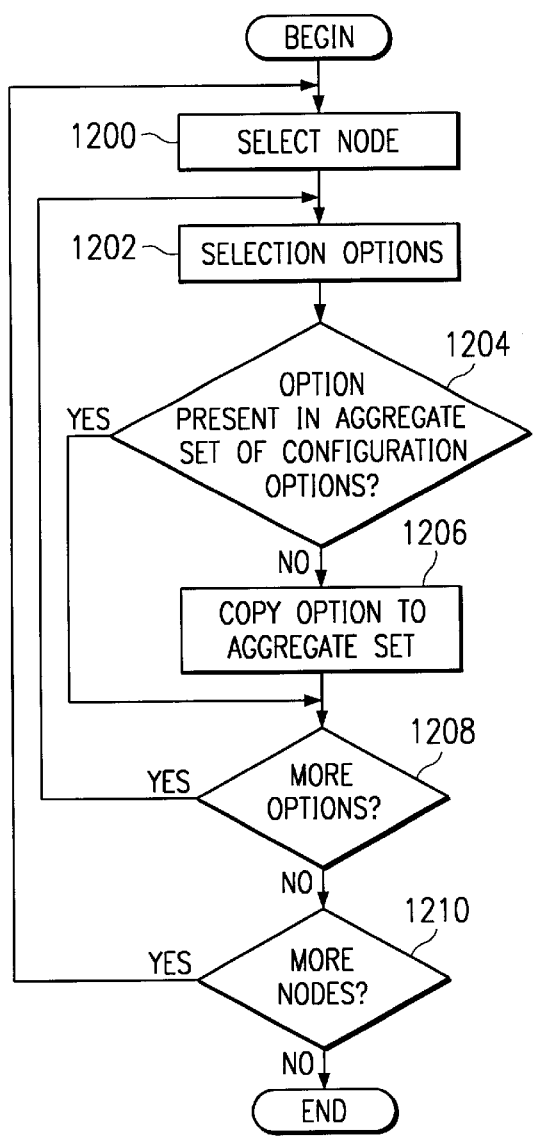
FIG. 12 is a flowchart of a process for generating response options in accordance with a preferred embodiment of the present invention.

With reference again to step 1116, if the child node is not a client identifier option, this node is inserted in order into the working queue after pointer P1 and before pointer P2 (step 1120) with the process then returning to step 1110. With reference again to step 1110, if additional unprocessed child nodes are absent, pointer P1 is reset to pointer P2 (step 1122) with the process then returning to step 1106 as described above. With reference now to FIG. 12, a flowchart of a process for generating response options is depicted in accordance with a preferred embodiment of the present invention. The process begins by selecting a configuration tree node (step 1200). The selection of a configuration tree node starts with the most specific node and works to less specific nodes. Thereafter, an option from the node is selected for processing (step 1202). A determination is made as to whether the option is present in the aggregate set of configuration options (step 1204). If the option is absent from the aggregate set, then that option is copied to the aggregate set of configuration option (step 1206). A determination is then made as to whether additional options are present in the node for processing (step 1208). If additional nodes are present, the process returns to step 1202. Otherwise, a determination is made as to whether additional nodes are present (step 1210). If additional nodes are present, the process returns to step 1200 to select an unprocessed node. Otherwise, the process terminates. With reference again to step 1204, if the option is present, then the process proceeds directly to step 1208 as described above. This process results in a set of aggregate configuration options and operating parameters to be sent to the client.

In generating a queue of matching configuration tree nodes in step 1006, the step begins with a tree of configuration node and an end in the ordered list of nodes, which specifies the most specific to least specific matching node of the original tree. Preference of matching node is determined first by depth and second by arbitrary preference value to determine preference of node carrying the same parent. While functional recursion also may be a viable implementation to reach the same result, the mechanism of the present invention employs two queues to avoid recursion along with a set of reference pointers to the second queue to allow for insertion into the queue. The first queue is the "visited-nodes" queue and results in the final ordered list and is strictly a last-in, first-out (LIFO) queue, although nodes are only added and not removed. The second queue is the working or "unvisited-nodes" queue containing nodes from the configuration tree matching client data by option number and option data. The nodes in the second queue are those that have not been yet examined for the presence of children or for any matching children. Insertion of a node into the working queue is handled within three tiers.

The first tier contains all of the previously inserted node in a previously determined ordering. The second tier contains all of the sibling nodes being inserted from the parent node most recently being examined with the exclusion of nodes that specify the client specifically. For example, a node whose option number and data specify a client identifier option, which is a uniquely identifying option for any client, is an example of a node that specifies the client specifically. The third tier is a LIFO queue of nodes specifying the client specifically through a matching client identifier option.

EXAMPLE 1

Figure 14:
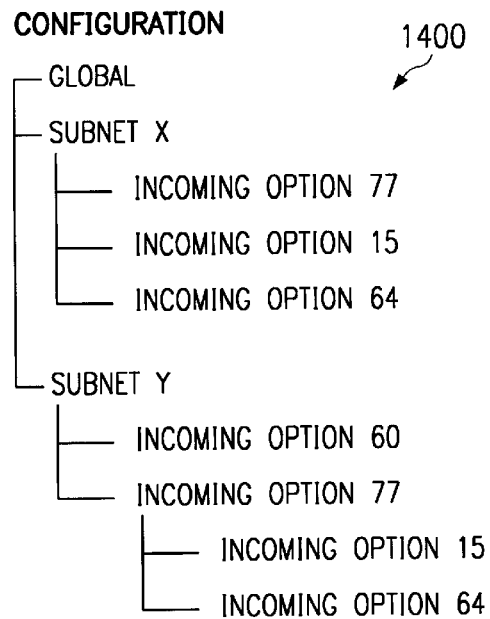
FIGS. 13 and 14 are diagrams illustrating the process for searching a server configuration tree in accordance with a preferred embodiment of the present invention.
Figure 13:
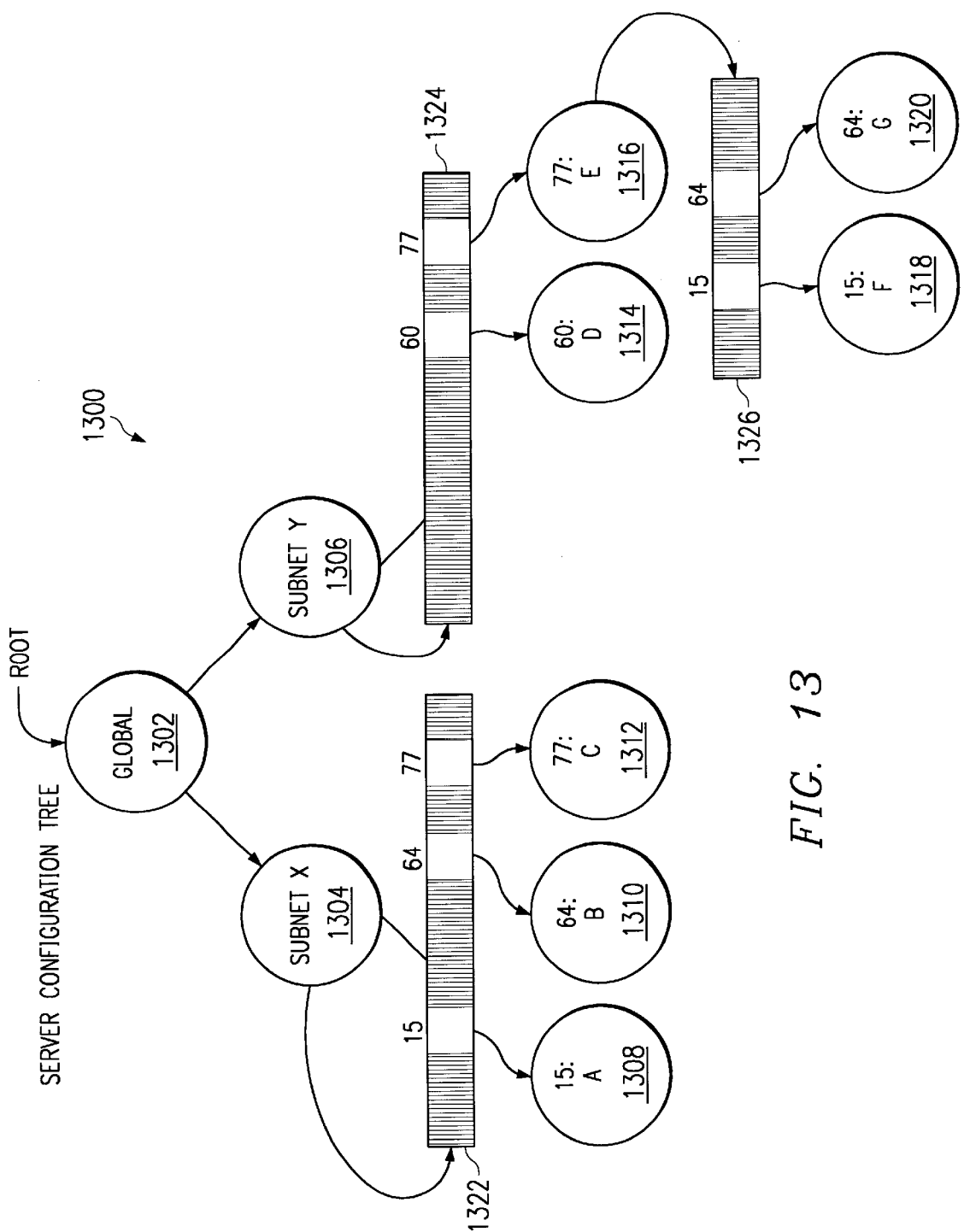

Turning now to FIGS. 13 and 14, diagrams illustrating the process for searching a server configuration tree is depicted in accordance with a preferred embodiment of the present invention. In FIG. 14, server configuration information 1400 is illustrated for a server. In these examples, the data sets themselves are not shown in the configuration diagrams or server configuration trees. Each of the options, however, does have a data set associated therewith. The illustrations of these data sets have been left out to more clearly explain the process of traversing a server configuration tree and identifying node.

After the nodes have been identified, a single data set composed as an aggregation of the datasets pointed to by each of the nodes in the list is returned to the client. Server configuration tree 1300 in FIG. 13 includes 1302–1320, along with arrays 1322, 1324, and 1326. Node 1302 is the root node representing the root portion of configuration 1400 identified as global in FIG. 13. Node 1304 represents subnet X, while node 1306 represents subnet Y. Nodes 1308–1312 represent node for options identified in association with subnet X, while nodes 1314–1320 are associated with options identified in association with subnet Y.

A container path is a list of containers chosen from the configuration trees as ones that match against the options and identifiers sent to the server by the client. From this list, the data sets pointed to or associated with the nodes are selected for transmission to the client. It is also from this list that the order of preference for duplicated data sets is determined. Such a duplication is not shown in this example but will be shown in a secondary example. In this example, server configuration 1400 and server configuration tree 1300 illustrate the use of two lists. In example 1, the options sent by the client were 60, 77, and 64.

Turning now to FIG. 15, a diagram illustrating traversal of server configuration tree 1300 is depicted in accordance with a preferred embodiment of the present invention. In these examples, a client sends information to the server matching subnet Y and node D 1314, node E 1316, and node G 1320. Table 1500 illustrates lists employed by the processes of the present invention. Two lists are used, one of matching, visited node and the other of unvisited or yet to be seen node.

In table 1500, nodes are placed onto the unvisited list when they match the client, but their children are yet to be examined. When a node's children are being examined it is said that the node is "visited". In the table 1500 the node currently being "visited" is the node most recently taken from the head of the "unvisited" queue. The only matching child for global 1302 is subnet Y 1306 (step 1501). This node is placed on the unvisited list instep 151. Node D 1314 and node E 1316 are placed onto the unvisited list, with subnet Y 1306 being moved to the visited list (step 1502). Both node D 1314 and node E 1316 are children nodes of subnet Y 1306, which matched the client. If an additional node was present as a child to subnet Y 1306, but did not match the client, that node would not be placed on the unvisited list.

In step 1503, node D 1314 is placed on the visited list. No children of node D 1314 are present. As a result, no additional nodes are placed on the unvisited list. If node D 1314 had additional children nodes but they did not match the information sent from the client, these nodes also would not be placed on the unvisited list. Node E 1316 is moved to the visited list and node G 1320 is added to the unvisited list (step 1504). Node G 1320 is the only child of node E 1316 matching the client. Node G 1320 is moved to the visited list (step 1505) with an order of preference being from a highest to lowest order being node G 1320, node E 1316, node D 1314, and subnet Y 1306.

EXAMPLE 2

Figure 16:
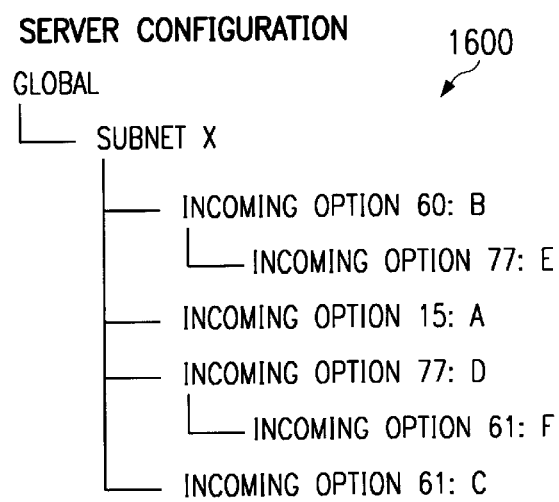
Figure 17:
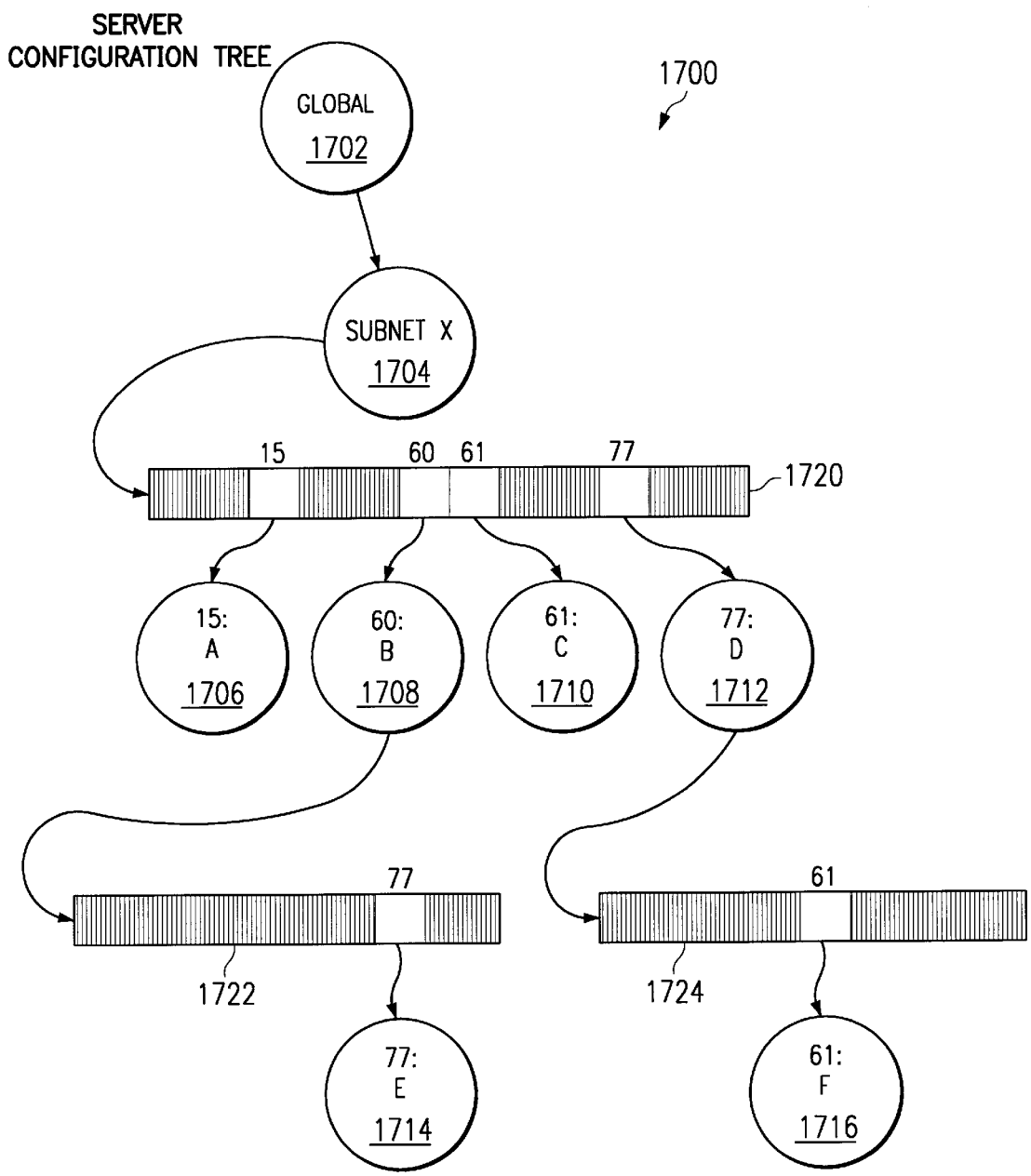

With reference now to FIGS. 16–18, diagrams illustrating identification of data for a client are depicted in accordance with a preferred embodiment of the present invention.

In configuration 1600 in FIG. 16 illustrate hierarchical configuration information for options. In FIG. 17, server configuration tree 1700 includes node 1702–1716. These containers are referenced using arrays 1718, 1720, and 1722. Options are shown in the order of preference for options of the same level in configuration 1600. Each of the nodes also contains a precedence value used to tell how to insert the node into the tree. In this example, the children of each node are stored at the array index that is equal to the option number in which the node is to be matched against. This removes the ability to preserve any order of preference conveyed in the server configuration data as shown in configuration 1600.

In the depicted examples, the servers will prefer that a client listed specifically in the configuration file receive data listed for it over any data in another area, such as a site class identifier node. Nodes in the these examples are inserted onto unvisited queues in a manner to preserve the configuration order of preference with definitions closer to the top of the outline of configuration data as illustrated in configuration 1600 being preferred. A value is placed into the nodes to preserve the order in which the nodes were created from the configuration data, such as that found in configuration 1600.

In this example in FIG. 18, a pair of pointers, pointer P1 and pointer P2, is used to track the beginning of the list into which the next matching child of the container of the node currently being examined is to be added. A second pointer is used to mark the end of the list into which the next matching child container is to be inserted. This marker denotes the beginning of the list of client-specific containers found in the search. As nodes are added between these two pointers, they are inserted on the order in which they appear in the configuration information listed in configuration 1600. A node with a higher preference is inserted closer to the first arrow, while a less preferable node is inserted closer to the second pointer, while a less preferable node is inserted closer to the first pointer.

In this example, in table 1800 subnet X, as identified by node 1704, matches the IP subnet from which the client sent the message. Node 1704, is added to the unvisited list (step 1802). As can be seen, pointer P1 is the first pointer, while pointer P2 is the second pointer. Subnet X 1704 is moved into the visited list, while each of the matching children of subnet X 1704 is placed into the unvisited list (step 1804). Node A 1706 is placed into the unvisited list between pointers P1 and P2 (step 1802). Node B 1708 is placed into the unvisited list between pointers P1 and P2 (step 1806). As can be seen, this insertion is based on the precedent order as the array of all children of subnet 1702 is processed using array 1718, node A 1706 is encountered when index 15 is reached. If this index and option data matches data sent by the client, it is added to the unvisited list. Node B 1708 is the next node found parsing array 1718. Node B 1708 is identified at index 60 and also matches the client information and is placed onto the list of the unvisited clients. According to the order of appearance in configuration 1600, node B 1708 is more preferable than node A 1706 and is placed after node A 1706. The next node, found in array 1716, is located at index 61. Node C 1710, in this example, is a configuration definition that matches the specific client. In this depicted example, any information at index 61 is to be preferred over all nodes that are not of the same exact matching type. As a result, node C 1710 is added to the end of the unvisited list. Of course, other types of preferences may be specified depending upon the particular implementation.

The next node, found in array 1718, is node D 1712 (step 1810). This node is identified in configuration 1600 as being less preferable to both node A 1706 and node B 1708. As a result, node D 1712 is placed ahead of node A 1706 and B 1708 in the unvisited list. After all of the children are considered, pointers P1 and P2 are changed to keep track of the list of client-specific nodes and to define the next place of insertion for non-client-specific nodes. Pointers P1 and P2 are moved to point between node B 1708 and node C 1710, with node 1710 being the client-specific node. As a result, the positions of all nodes in the unvisited list that appear before the first pointer, P1, are locked in place. Next, in step 1812, node D 1712 is moved from the unvisited list and the visited list, and its matching child, node F 1716, is added to the unvisited list. Node A 1706 is moved from the unvisited list to the visited list (step 1814). Node A 1706 has no children nodes for examination in this example. Next, in step 1816, node B 1708 is moved from the unvisited list to the visited list. Additionally, the matching children for node B 1708 and node E 1714 are added to the unvisited list between pointers P1 and P2. Thereafter, pointer P1 is moved to the same place as pointer P2. Node E 1714 is moved from the unvisited list to the visited list and has no additional children for examination (step 1818). Thereafter, node C 1710 is moved from the unvisited list to the visited list (step 1820), and because this node has no children nothing is added to the unvisited list. Finally, node F 1716 is moved from the unvisited list to the visited list (step 1822), and because this node has no children, nothing is added to the unvisited list. The resulting order of preference from highest to lowest is node F 1716, node C 1710, node E 1714, node B 1708, node A 1706, node D 1712, and subnet x 1704. As can be seen in this example, incoming options 77 are found in array 1720 and array 1722 in FIG. 17. Node E 1714 is selected over node D 1712 because node E 1714 is higher up on the preference list than node D 1712.

It is important to note that, while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a distributed data processing system for identifying a client in the distributed data processing system, the method comprising the computer implemented steps of:

receiving a request at a server front the client for configuration information, wherein the request includes a subnet mask;

responsive to receiving the request, identifying configuration information for the client using a plurality of nodes associated in a tree structure to form identified configuration information based on the subnet mask, wherein each node in the tree structure is associated with configuration information; and sending a response to the request using identified configuration information.

2. The method of claim 1, wherein the step of identifying configuration information comprises:

identifying at least one parameter in the request;

traversing the tree structure to identifying matching nodes within the plurality or nodes based on the subnet mask and the at least one parameter to form a set of identified nodes; and identifying configuration information associated with the set of nodes to form the identified configuration information.

3. The method of claim 2, wherein the plurality of nodes includes a root node and wherein the step of traversing the tree structure comprises:

traversing the tree structure starting from the root node;

placing a node into a first queue examining the node; and placing the node in the first queue into a second queue in response to the node matching a parameter in the request, wherein configuration information associated with nodes in the second queue from the identified configuration information.

4. The method of claim 3, wherein the step of placing the node in the first queue results in nodes in the first queue being arranged in an order of priority.

5. The method of claim 1, wherein the identified configuration information includes an address for the client.

6. The method of claim 1, wherein the identified configuration information includes an Internet Protocol address for the client.

7. The method of claim 1, wherein the identified configuration information includes operating parameters for the client.

8. A method in a distributed data processing system for identifying a client in the distributed data processing system, the method comprising the computer implemented steps of;

receiving a request at a server from the client for configuration information;

responsive to receiving the request, identifying configuration information for the client using a plurality of node associated in a tree structure to form identified configuration information, wherein each node is associated with configuration information; and sending a response to the request using identified configuration information, wherein the step of identifying configuration information comprises:

identifying parameters in the request;

traversing the tree structure to identifying matching nodes within the plurality of nodes to form a set of identified nodes; and identifying configuration information associated with the set of nodes to form the identified configuration information, wherein the plurality of nodes includes a root node and wherein the step of traversing the tree structure comprises:

traversing the tree structure starting from the root node;

placing a node into a first queue examining the node; and placing the node in the first queue into a second queue in response to the node matching parameters in the request, wherein configuration information associated with nodes in the second queue form the identified configuration information, wherein the first queue includes:

a first tier for containing nodes, which are non-specific to the client and added prior to a current node being examined;

a second tier for containing nodes, which are non-specific to the client and added with the current node is being examined; and a third tier for containing nodes, which are specific to the client.

9. A method in a distributed data processing system for selecting configuration information for a client in the distributed data processing system, the method comprising the computer implemented steps of:

receiving a request at server from the client for configuration information;

identifying a subnet end an identification token for the client from the request;

traversing a plurality of containers in a hierarchical structure using the subnet and identification token to identify selected containers within the plurality of containers matching the subnet and the identification token, wherein each container in the hierarchical structure stores configuration information;

selecting configuration information from selected containers within the plurality of containers based on the subnet and the identification token to form selected configuration information; and sending the selected configuration information to the client.

10. The method of claim 9, wherein the traversing step results in the selected containers being placed in an order of preference and wherein the step of selecting configuration information includes selecting a container most specific to the client being selected from selected containers having a same type configuration information for the client.

11. The method of claim 9, wherein the traversing step traverses the plurality of containers from a most specific container to a least specific container.

12. A configuration data structure for use in a data processing system to select configuration information for a client, the configuration data structure comprising:

a tree structure; and a plurality of containers in the tree structure, wherein each container in the tree structure stores configuration information, wherein the plurality of containers are arranged hierarchically, wherein a container within the plurality of containers on one level is associated with containers on another level using an array of pointers indexed using an identification token; wherein each container within the plurality of containers includes an identifier type used to match an identification token in a request and configuration information; wherein at least one container in a first level is associated with a subnet; and wherein at least one of the plurality of containers is selected to select configuration information for the client.

13. The configuration data structure of claim 12, wherein the configuration information is a data structure containing the configuration information to be returned to the client.

14. A distributed data processing system for identifying a client in the distributed data processing system, the distributed data processing system comprising:

receiving means for receiving a request at a server from the client for configuration information, wherein the request includes a subnet mask;

identifying means, responsive to receiving the request, for identifying configuration information for the client using a plurality of nodes associated in a tree structure to form identified configuration information based on the subnet mask, wherein each node in the tree structure is associated with configuration information; and sending, means for sending a response to the request using identified configuration information.

15. The distributed data processing system of claim 14, wherein the identifying means comprises:

first identifying means for identifying at least one parameter in the request;

traversing means for traversing the tree structure to identifying matching nodes within the plurality of nodes based on the subnet mask and the at least one parameter to form a set of identified nodes, and second identifying means for identifying configuration information associated with the set of nodes to form the identified configuration information.

16. The distributed data processing system of claim 15, wherein the plurality of nodes includes a root node and wherein the traversing means comprises:

traversing means for traversing the tree structure starting from the root node;

first placing means for placing a node into a first queue examining the node; and second placing means for placing the node in the first queue into a second queue in response to the node matching a parameter in the request, wherein configuration information associated with nodes in the second queue form the identified configuration information.

17. The distributed data processing system of claim 16, wherein the means of placing the node in the first queue results in nodes in the first queue being arranged in an order of priority.

18. The distributed data processing system of claim 14, wherein the identified configuration information includes an address for the client.

19. The distributed data processing system of claim 14, wherein the identified configuration information includes an Internet Protocol address for the client.

20. The distributed data processing system of claim 14, wherein the identified configuration information includes operating parameters for the client.

21. A distributed data processing system for identifying a client in the distributed data processing system, the distributed data processing system comprising:

receiving means for receiving a request at a server from the client for configuration information;

identifying means, responsive to receiving the request, for identifying configuration information for the client using a plurality of nodes associated in a tree structure to form identified configuration information, wherein each node is associated with configuration information; and sending means for sending a response to the request using identified configuration information, wherein the identifying means comprises:

first identifying means for identifying parameters in the request;

traversing means for traversing the tree structure to identifying matching nodes within the plurality of nodes to form a set of identified nodes; and second identifying means for identifying configuration information associated with the set of nodes to form the identified configuration information, wherein the plurality of nodes includes a root node and wherein the traversing means comprises:

traversing means for traversing the tree structure starting from the root node;

first placing means for placing a node into a first queue examining the node; and second placing means for placing the node in the first queue into a second queue in response to the node matching parameters in the request, wherein configuration information associated with nodes in the second queue form the identified configuration information, wherein the first queue includes:
- a first tier for containing nodes, which are non-specific to the client and added prior to a current node being examined;
- a second tier for containing nodes, which are non-specific to the client and added while the current node is being examined; and
- a third tier for containing nodes, which are specific to the client.

22. A distributed data processing system for selecting configuration information for a client in the distributed data processing system, the distributed data processing system comprising:

receiving means for receiving a request at server from the client for configuration information;

identifying means for identifying a subnet and an identification token for the client from the request;

traversing means for traversing a plurality of containers in a hierarchical structure using the subnet and identification token to identify selected containers within the plurality of containers matching the subnet and the identification token, wherein each container in the hierarchical structure stores configuration information;

selecting means for selecting configuration information from selected containers within the plurality of containers based on the subnet and the identification token to form selected configuration information; and sending means for sending the selected configuration information to the client.

23. The distributed data processing system of claim 22, wherein the traversing means results in the selected containers being placed in an order of preference and wherein the means of selecting configuration information includes selecting a container most specific to the client being selected from selected containers having a same type of configuration information for the client.

24. The distributed data processing system of claim 22, wherein the traversing means traverses the plurality of containers from a most specific container to a least specific container.

25. A computer program product in a computer readable medium for identifying a client, the computer program product comprising:

first instructions for receiving a request at a server from the client for configuration information, wherein the request includes a subnet mask;

second instructions, responsive to receiving the request, for identifying configuration information for the client using a plurality of nodes associated in a tree structure to form identified configuration information based on the subnet mask, wherein each node in the tree structure is associated with configuration information; and third instructions for sending a response to the request using identified configuration information.

26. A computer program product in a computer readable medium for selecting configuration information for a client, the computer program product in a computer readable medium comprising:

first instructions for receiving a request at server from the client for configuration information;

second instructions for identifying a subnet and an identification token for the client from the request;

third instructions for traversing a plurality of containers in a hierarchical structure using the subnet and identification token to identify selected containers within the plurality of containers matching the subnet and identification token, wherein each container in the hierarchical structure stores configuration information;

fourth instructions for selecting configuration information from selected containers within the plurality of containers based on the subnet and the identification token to form selected configuration information; and fifth instructions for sending the selected configuration information to the client.

* * * * *

UNITED STATES PATENT AND TRADEMARK OFFICE
CERTIFICATE OF CORRECTION

PATENT NO. : 6,697,851 B1
APPLICATION NO. : 09/389198
DATED : February 24, 2004
INVENTOR(S) : Althaus et al.

It is certified that error appears in the above-identified patent and that said Letters Patent is hereby corrected as shown below:

Col. 17, line 50: after "server" delete "front" insert --from--.

Col. 18, line 12: after "queue" delete "from" and insert --form--.

Col. 18, line 27: after "steps of" delete " ; " and insert -- : --.

Col. 18, line 32: before "associated" delete "node" and insert --nodes--.

Col. 18, line 63: after "added" delete "with" and insert --while--.

Col. 19, line 7: after "subnet" delete "end" and insert --and--.

Col. 19, line 63: before "means for" delete "sending," and insert --sending--.

Signed and Sealed this

Twenty-seventh Day of March, 2007

JON W. DUDAS
*Director of the United States Patent and Trademark Office*